FLIP-FLOP COUNTER CIRCUIT

Filed April 30, 1949 2 Sheets-Sheet 1

INVENTOR
Everett Eberhard
BY [signature]
ATTORNEY

INVENTOR
Everett Eberhard
BY H. D. Newton
ATTORNEY

Patented Dec. 5, 1950 2,533,001

UNITED STATES PATENT OFFICE 2,533,001

FLIP-FLOP COUNTER CIRCUIT

Everett Eberhard, Haddonfield, N. J., assignor to Radio Corporation of America, a corporation of Delaware Application April 30, 1949, Serial No. 90,685

26 Claims. (Cl. 171—97)

This invention relates generally to triggered electronic circuits, and particularly relates to flip-flop circuits or pulse counters having two stable states of operation.

A flip-flop circuit may be defined as an Eccles-Jordan or direct-coupled multivibrator having two conditions of stable equilibrium. Generally, a flip-flop circuit is a triggered circuit having two stable limiting conditions into which the circuit is alternately triggered by a trigger pulse. A flip-flop circuit may, for example, find use in electronic counters such as a decade counter or in electronic computers.

Conventional flip-flop circuits have a number of disadvantages. Thus, they usually require two amplifiers which usually consist of two thermionic tubes. Accordingly, the power consumption of an electronic counter including a conventional flip-flop circuit is comparatively high, and in view of the relatively small efficiency of the circuit a large portion of the power must be dissipated as heat. Hence, the dissipation of heat is a serious problem in electronic computers requiring a larger number of tubes. Furthermore, the physical size of a flip-flop circuit is appreciable which makes it difficult to house a complicated electronic counter. Frequently, the problem arises of counting electric pulses which may be developed by radioactive radiation. Such pulses have a recurrence rate corresponding to a wide frequency range, that is, they do not recur within predetermined time intervals.

The flip-flop circuit of the present invention incorporates a three-electrode semi-conductor amplifier which has been termed a "transistor." This device has been disclosed in a series of three letters to the Physical Review by Bardeen and Brattain, Brattain and Bardeen, and Shockley and Pearson which appear on pages 230 to 233 of the July 15, 1948, issue. The new amplifier includes a block of a semi-conducting material such as silicon or germanium which is provided with two closely adjacent point electrodes called "emitter" and "collector" electrodes in contact with one surface region of the material, and a "base" electrode which provides a large-area, low-resistance contact with another surface region of the semi-conducting material.

It is accordingly the principal object of the present invention to provide a novel triggered flip-flop circuit requiring but a single amplifier of the semi-conductor type.

Another object of the invention is to provide a novel pulse counter having a count-down ratio of two and responsive to trigger pulses of a frequency which may vary within wide limits.

A further object of the invention is to provide a flip-flop circuit including a three-electrode semi-conductor device or amplifier suitable for electronic counters or computers and requiring considerably less power and less space and developing less heat than prior counter circuits.

A triggered circuit in accordance with the present invention includes a three-electrode semiconductor amplifier. The amplifier consists of a semi-conducting body provided with a large-area base electrode and with small-area emitter and collector electrodes. Means are provided for supplying potentials to the electrodes, thereby to render the amplifier normally conducting. To this end there may be impressed a comparatively large reverse bias on the collector electrode and a comparatively small forward bias on the emitter electrode, both potentials being taken with respect to the base electrode. Trigger pulses are impressed between two of the electrodes such as between emitter and base electrodes or between collctor and base electrodes. The trigger pulses may be of opposite polarities. A trigger pulse of a predetermined polarity will flip the circuit from one stable condition of current conduction to its other stable condition of current conduction. However, a modified flip-flop circuit of the invention is responsive to trigger pulses of one polarity which will flip the circuit from either stable condition into the other stable condition.

In accordance with the present invention an impedance element is provided for effectively coupling the emitter and collector electrodes, that is, the impedance element is common to the emitter and collector circuits. Thus, one of the electrodes such as the emitter electrode is responsive to changes of the current flowing through and changes of the voltage existing at one of the other electrodes.

The novel features that are considered characteristic of this invention are set forth with particularity in the appended claims. The invention itself, however, both as to its organization and method of operation, as well as additional objects and advantages thereof, will best be under stood from the following description when read in connection with the accompanying drawings, in which:

Figures 1, 2, 3, 4, 5, 6, 7:
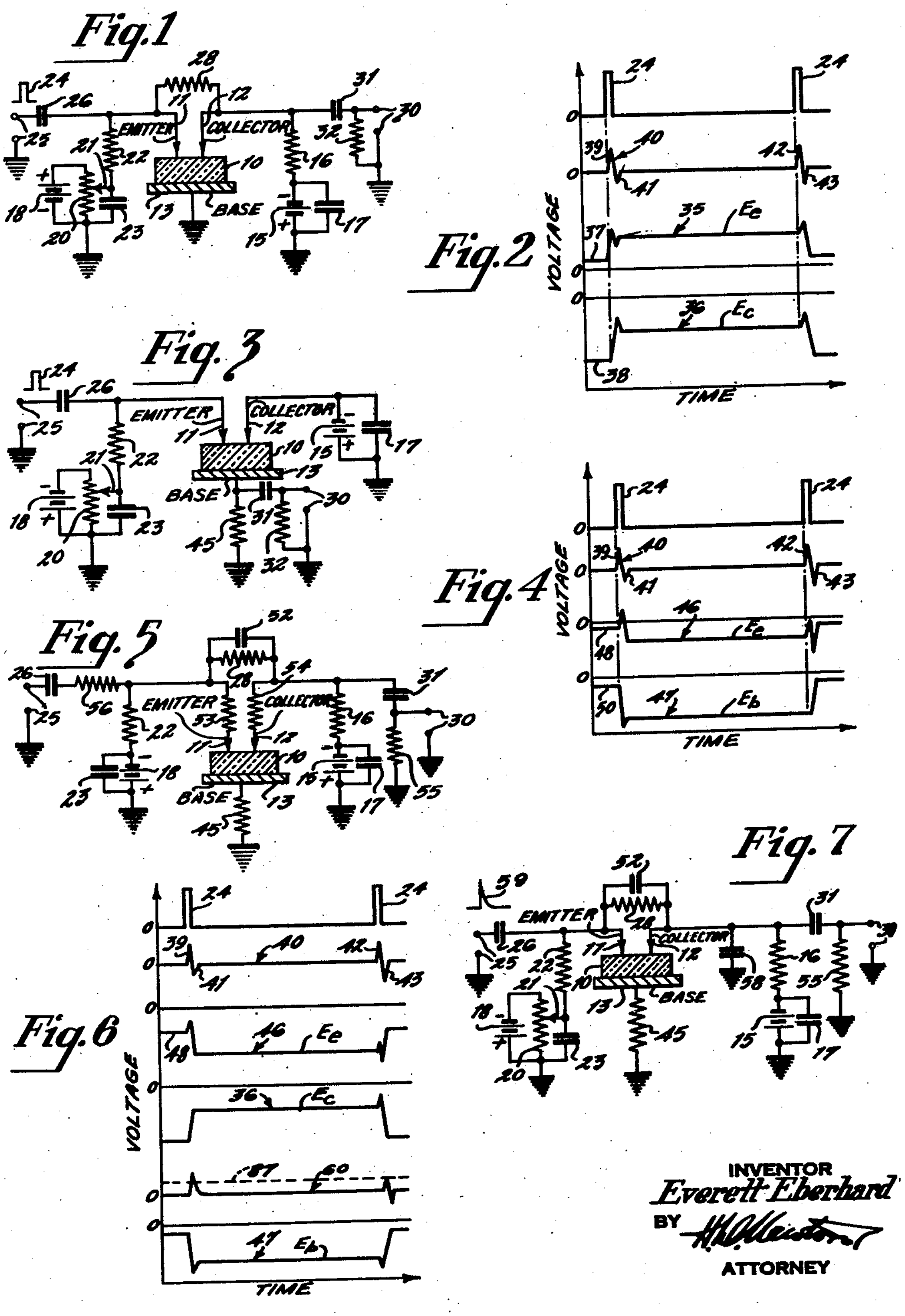
Figure 1 is a circuit diagram of a flip-flop circuit embodying the present invention and having a common admittance between emitter and collector electrodes.
Figure 2 is a graph showing the voltages existing at various points of the circuit of Figure 1.
Figure 3 is a circuit diagram of a flip-flop circuit in accordance with the invention having an impedance element common to both emitter and collector circuits.
Figure 4 is a graph showing the voltages existing at various points of the circuit of Figure 3.
Figure 5 is a circuit diagram of a preferred embodiment of the flip-flop circuit of the invention combining the features of the circuits of Figures 1 and 3.
Figure 6 is a graph showing the voltages existing at various points of the circuit of Figure 5.
Figure 7 is a circuit diagram of a modified flip-flop circuit in accordance with the invention which is responsive to trigger pulses of one polarity.

Referring now to the drawing, in which like components have been designated by the same reference numbers throughout the figures, and particularly to Figure 1, there is illustrated a flip-flop circuit or pulse counter incorporating a three-electrode semi-conductor device or amplifier. The amplifier comprises a block or body 10 of semi-conducting material which may consist, for example, of boron, silicon, germanium, tellurium or selenium containing a small but sufficient number of atomic impurity centers or lattice imperfections as commonly employed for best results in crystal rectifiers. Germanium is the preferred material for body 10 and may be prepared, as is well known, so as to be an electronic N type semi-conductor. The surface of semi-conducting body 10 may be polished and etched in the manner explained in the recent paper by Becker and Shive which appears on pages 215 to 221 of the March 1949 issue of "Electrical Engineering." It is also feasible to utilize the germanium block from a commercial high-back-voltage germanium rectifier such as the type 1N44, in which case further surface treatment may not be required.

Semi-conducting body 10 is provided with emitter electrode 11, collector electrode 12 and base electrode 13. Emitter electrode 11 and collector electrode 12 are small-area electrodes and may, for example, be point electrodes consisting of tungsten or phosphor-bronze wires having a diameter of the order of 2 to 10 mils. Emitter and collector electrodes 11, 12 are normally placed closely adjacent to each other either on the same surface of semi-conducting body 10 or on opposite surfaces thereof and may be separated by a distance of from 2 to 5 mils. Base electrode 13 provides a large-area low-resistance contact with the bulk material of semi-conducting body 10.

For the following discussion it will be assumed that body 10 consists of an N type electronic semi-conducting material. The amplifier is supplied with operating potentials and to this end a comparatively large reverse bias is applied to collector electrode 12 and a comparatively small forward bias to emitter electrode 11 both bias voltages being taken with respect to base electrode 13. In other words, collector electrode 12 is maintained negative with respect to base electrode 13 which is grounded while emitter electrode 11 may normally be maintained at a positive bias potential with respect to base electrode 13. Accordingly, a suitable voltage source such as battery 15 has its positive terminal grounded while its negative terminal is connected to collector electrode 12 through resistor 16. Battery 15 may be bypassed by capacitor 17. Emitter electrode 11 is biased by another suitable voltage source such as battery 18 having its negative terminal grounded while its positive terminal is grounded through voltage divider 20. An adjustable potential may be impressed on emitter electrode 11 through movable tap 21 provided on voltage divider 20 and connected to emitter electrode 11 through resistor 22. A bypass capacitor 23 may be provided between tap 21 and ground.

Trigger pulses indicated at 24 are impressed on input terminals 25, one of which is grounded while the other one is coupled to emitter electrode 11 through capacitor 26. For a purpose to be explained hereinafter capacitor 26 and resistor 22 are arranged to partially differentiate the trigger pulses. In accordance with the present invention, resistor 28 is connected between emitter electrode 11 and collector electrode 12. The output signal may be derived from output terminals 30, one of which is grounded while the other one is coupled to collector electrode 12 through coupling capacitor 31. Capacitor 31 and resistor 32 may also be arranged as a differentiating network to differentiate the square wave 36 thereby to derive positive and negative output pulses.

The theory of operation of a three-electrode semi-conductor amplifier is believed to be sufficiently explained in the various papers above referred to so that further explanation here is not deemed to be necessary. In accordance with the present invention the three-electrode semi-conductor is utilized as a flip-flop or counter circuit having two stable states of operation. In other words, the device will either conduct a large amount of current or a small amount of current and the trigger pulses will flip the circuit from one condition of stable equilibrium to the other condition of stable equilibrium.

Let it be assumed that the flip-flop circuit conducts a small amount of current so that the collector current as well as the emitter current are small. Curve 35 of Figure 2 illustrates the emitter voltage $E_e$ with respect to time while curve 36 illustrates the collector voltage $E_c$. The trigger pulses 24 impressed on input terminals 25 are also illustrated in Figure 2. Under the assumed condition of small current conduction the emitter voltage is slightly above ground as shown by curve portion 37 while the collector voltage is at an appreciable negative voltage with respect to ground as shown by curve portion 38. This is due to the fact that only a relatively small current flows through resistor 16 so that the voltage of collector electrode 12 approaches that of battery 15. In view of the current flowing through resistor 28 the voltage of emitter electrode 11 will be intermediate the positive voltage of tap 21 and the negative voltage of collector electrode 12. This voltage is adjusted by tap 21 to be just sufficient to permit a small amount of current conduction in the collector circuit including collector electrode 12.

Let it now be assumed that the first trigger pulse 24 is impressed on input terminals 25. This trigger pulse is differentiated by network 26, 22 before being impressed on emitter electrode 11 and has the shape shown by curve 40 of Figure 2. The positive portion 39 of the differentiated pulse will raise the emitter voltage $E_e$ as clearly shown by curve 35. This, in turn, will cause a larger collector current to flow so that the collector voltage $E_c$ approaches ground potential as shown by curve 36. As soon as the collector voltage $E_c$ increases in a positive direction the voltage of emitter electrode 11 is permitted to increase further in the positive direction due to the regenerative action of resistor 28. Resister 28 accordingly causes a rapid changeover from one stable condition of current conduction to the other stable condition of current conduction until the new stable equilibrium has been reached.

The negative portion 41 of the differentiated trigger pulse 40 will not be able to trigger the circuit back into its low current conduction state. This is due to the fact that the negative portion 41 has a smaller amplitude than the positive portion 39. It is believed that the reason for this experimental evidence is that the impedance looking into emitter electrode 11 is comparatively high when the circuit is in its condition of low conduction. Hence, the input pulse 24 is only partially differentiated by network 26, 22 and the amplitude of the negative portion 41 is smaller than that of the positive portion 39. It is accordingly essential that the width of trigger pulses 24 be no more than the time required for the circuit to change from one equilibrium to its other equilibrium.

The flip-flop circuit of Figure 1 will now continue in its high current conduction state until the next trigger pulse occurs. It is to be understood that the high current equilibrium state is a stable one due to the fact that the collector electrode 12 is near ground potential and that the voltage divider 28, 22 now permits the emitter voltage to be much more positive than before as illustrated by curve 35. The positive portion 42 of the next trigger pulse will have little effect on the flip-flop circuit because the circuit already is in its maximum state of current conduction. However, the negative portion 43 of the differentiated trigger pulse will flop the circuit back into its original state of low current conduction. This may be explained as follows. Negative pulse portion 43 has approximately the same amplitude as positive pulse portion 42 because the impedance looking into the emitter electrode 11 is low with the device in its high conduction state and complete differentiation occurs in capacitor 26.

Accordingly, the voltage of emitter electrode 11 swings just positive and then negative as indicated by curve 35. This will immediately reduce the amount of collector current so that the collector voltage $E_c$ becomes more negative as shown by curve 36. This, in turn, will make the emitter voltage $E_e$ more negative due to the regenerative action of resistor 28. Accordingly, the circuit rapidly reaches its original equilibrium condition and the cycle of operation repeats upon the arrival of the next trigger pulse.

Resistor 28 is common to both emitter and collector electrodes and provides a common current for the emitter and collector circuits. Accordingly, resistor 28 functions as a common admittance between emitter electrode 11 and collector electrode 12.

Figure 9:
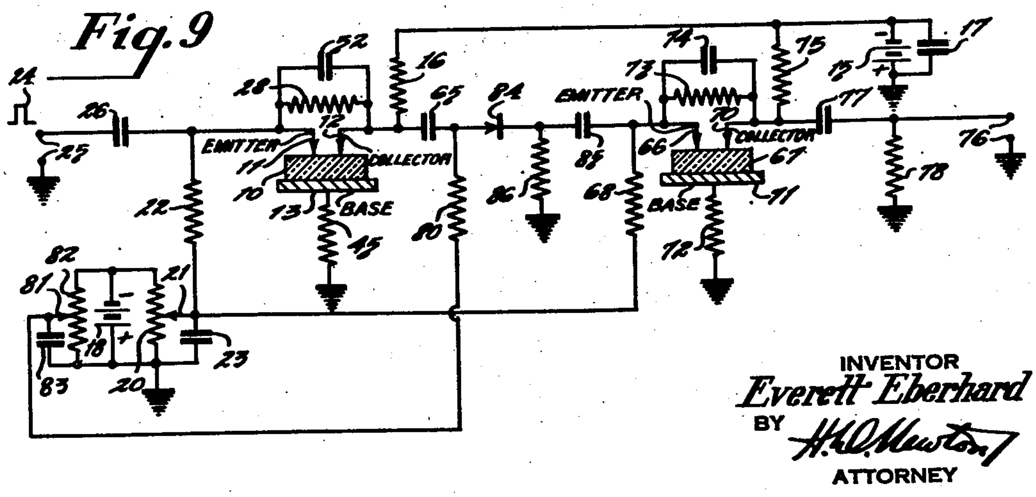
Figure 9 is a circuit diagram of a two-stage counter in accordance with the invention.

As pointed out hereinabove, resistor 32 and capacitor 31 may be arranged as a differentiating network for differentiating the square output pulse 36 obtained from collector electrode 12. It is accordingly feasible to connect output terminals 30 through a suitable clipper (as shown in Figure 9) to the emitter electrode of a subsequent counter stage provided with a suitable emitter bias supply. It is also feasible to apply trigger pulses 24 between collector electrode 12 and base electrode 13 in which case, however, trigger pulses of higher amplitude are required.

Figure 3 illustrates a flip-flop circuit in accordance with the invention having an impedance common to both emitter and collector circuits. This impedance is represented by a resistor 45 connected between base electrode 13 and ground. The circuit of Figure 3 does not have the regenerative resistor 28. Furthermore, no resistor is provided between battery 15 and collector electrode 12. The emitter circuit is substantially identical with that of Figure 1, and the trigger pulses 24 are impressed on input terminals 25. The output signal is obtained across resistor 32 from output terminals 30 one of which is connected through coupling capacitor 31 to base electrode 13.

The flip-flop circuit of Figure 3 also has two stable states of current conduction. This may be explained by the fact that the current gain when plotted against the emitter current or voltage has two points of unity gain corresponding to a high current conduction and a low current conduction equilibrium state. In the region between these two points the current gain is above unity and outside of this region the current gain is below unity. Therefore, the circuit will be unstable within this region but stable on either side.

Let it now be assumed that the flip-flop circuit of Figure 3 conducts a small amount of current. In that case, the emitter voltage $E_e$ shown by curve 46 of Figure 4 will be slightly negative as will be the base voltage $E_b$ of curve 47 as evidenced by curve portions 48 and 50 respectively. Tap 21 should be adjusted in such a manner that the emitter voltage $E_e$ is slightly positive with respect to the base voltage $E_b$. However, as shown by curve 46 the emitter voltage $E_e$ may be negative with respect to ground because the base voltage $E_b$ will be still more negative with respect to ground and accordingly the positive terminal of battery 18 may be grounded as shown in Figure 3 to supply a negative bias voltage to emitter electrode 11.

Let it now be assumed that a trigger pulse 24 is applied to input terminals 25 so that the partially differentiated pulse 40 is impressed on emitter electrode 11. The positive portion 39 of the differentiated pulse will raise the emitter voltage whereupon the collector current increases as previously explained. Since the collector current flows through base resistor 45 the base voltage $E_b$ increases in a negative direction as shown by curve 47. This, in turn, will increase the emitter voltage $E_e$ with respect to the base voltage $E_b$ so that still more current is flowing through collector electrode 12 and base resistor 45. It will accordingly be seen that base resistor 45 provides a positive feedback or regenerative action to bring the circuit rapidly into its other stable state of operation.

The negative portion 41 of the differentiated pulse is again of small amplitude so that it will be unable to trigger the circuit back into the low current conduction state as has already been explained.

The circuit now remains in its high current conduction state until the arrival of the next trigger pulse 24. As explained previously, trigger pulse 24 will now be fully differentiated due to the lower emitter impedance and pulse portions 42 and 43 will be of approximately equal amplitude. The positive portion 42 of the differentiated trigger pulse will have little effect on the operation of the circuit because it would only tend to increase the current conduction which already has reached its maximum value. However, the negative portion 43 of the differentiated pulse will depress the emitter potential $E_e$ as shown by curve 46. This causes immediately a reduction of the collector current whereupon the base voltage $E_b$ rises. Consequently, the bias potential between emitter electrode 11 and base electrode 13 is further reduced so that the circuit is rapidly flopped into its previous low-current conduction state. The cycle of operation will then repeat upon the arrival of the next trigger pulse.

Resistor 45 accordingly represents an impedance element common to both emitter and collector circuits so that emitter electrode 11 and collector electrode 12 have a common voltage which is the base voltage $E_b$. It is also feasible to apply the trigger pulses between base electrode 13 and ground or collector electrode 12. A subsequent flip-flop circuit or counter stage may be connected to output terminals 30 in the manner explained hereinafter in connection with Figure 9.

The circuit of Figure 5 combines the features of the flip-flop circuits of Figures 1 and 3 and represents the preferred embodiment of the invention. Thus, base electrode 13 is connected to ground through base resistor 45. Resistor 28 is connected between emitter electrode 11 and collector electrode 12 and may be shunted by capacitor 52. Resistor 53 may be provided between the junction point of resistors 28 and 22 and emitter electrode 11. Another resistor 54 may be provided between the junction point of resistors 28 and 16 and collector electrode 12. The collector circuit otherwise is the same as that of the flip-flop circuit of Figure 1. A differentiating network including capacitor 31 and resistor 55 connected between ground and the junction point between resistors 16 and 54 may be provided, and the output terminals 30 may be connected across resistor 55.

Input terminals 25 may be connected through capacitor 26 and resistors 56 and 53 to emitter electrode 11. Battery 18 is connected to emitter electrode 11 through resistors 22 and 53. It should be pointed out, however, that resistors 53, 54 and 56 are not required for the operation of the circuit but serve the purpose of limiting the current through emitter electrode 11 and collector electrode 12. Furthermore, capacitor 52 may also be omitted but it serves the purpose of providing a faster transition between the two stable states of operation of the circuit.

The operation of the circuit of Figure 5 will be evident from the previous explanations given with respect to the circuits of Figures 1 and 3. Figure 6 illustrates the trigger pulses 24 impressed on input terminals 25 and the partially differentiated trigger pulses 40 obtained by differentiating network 26, 56, 22. Curve 46 illustrates the emitter voltage $E_e$ which is similar to the curve of Figure 4. Curve 36 illustrates the collector voltage $E_c$ which is similar to curve 36 of Figure 2. Curve 47 shows the base voltage $E_b$ which is similar to the same curve of Figure 4. Finally, curve 60 illustrates the differentiated output pulse which is obtained from output terminals 30 and differentiated by network 31, 55.

It is to be understood that trigger pulses 24 could also be of negative polarity but experiments have shown that the circuit performs better with positive trigger pulses of the type illustrated in the drawing. In every case a positive pulse portion which may be the positive portion 39 of a differentiated pulse will trigger the circuit into its high conduction equilibrium while a negative differentiated pulse portion such as portion 43 will trigger the circuit into the low conduction equilibrium. In the circuit of Figure 5 the trigger pulses may also be impressed on base electrode 13 or on collector electrode 12 instead of being impressed on emitter electrode 11.

While it will be understood that the circuit specifications of the flip-flop circuit of the invention may vary according to the design for any particular application, the following circuit specifications for the circuit of Figure 5 are included by way of example only:

| | |
|---|---|
| Capacitor 26 | 4,700 micromicrofarads |
| Capacitor 52 | 330 micromicrofarads |
| Capacitor 31 | 1,000 micromicrofarads |
| Resistor 56 | 1,200 ohms |
| Resistor 22 | 3,900 ohms |
| Resistor 53 | 48 ohms |
| Resistor 28 | 15,000 ohms |
| Resistor 54 | 470 ohms |
| Resistor 16 | 5,600 ohms |
| Resistor 55 | 10,000 ohms |
| Resistor 45 | 15,000 ohms |
| Battery 15 | 59 volts |
| Battery 18 | 17.7 volts |

With the above specifications the collector bias boltage was −40 volts, the base bias voltage −17.6 volts and the emitter bias voltage −9.7 volts. The collector current was 3.1 milliamperes and the emitter current 2.0 milliamperes. The circuit operated successfully with a trigger pulse frequency between 70 and 7000 cycles. The width of each trigger pulse was between 2 and 5 microseconds. The amplitude of the trigger pulses was between 4 and 9 volts. The circuit operated successfully when the voltage of battery 15 was varied by ±2.5 volts and when the emitter bias voltage was varied by ±.5 volt.

Figure 7 shows a modified flip-flop circuit which is responsive to trigger pulses of one polarity. The flip-flop circuit of Figure 7 is somewhat similar to that of Figure 5. However, resistors 53, 54 and 56 of the circuit of Figure 5 have been omitted. Furthermore, the bias voltage supplied to emitter electrode 11 may be adjustable by tap 21 in the manner illustrated in Figures 1 and 3. The flip-flop circuit of Figure 7 is mainly distinguished over that of Figure 5 by the provision of stabilizing capacitor 58 connected between collector electrode 12 and ground. Stabilizing capacitor 58 may, for example, have a capacitance of 1000 micromicrofarads. Capacitor 26 and resistor 22 need not be arranged as differentiating network as in previous circuits. This will be more fully explained hereinafter.

Figure 8:
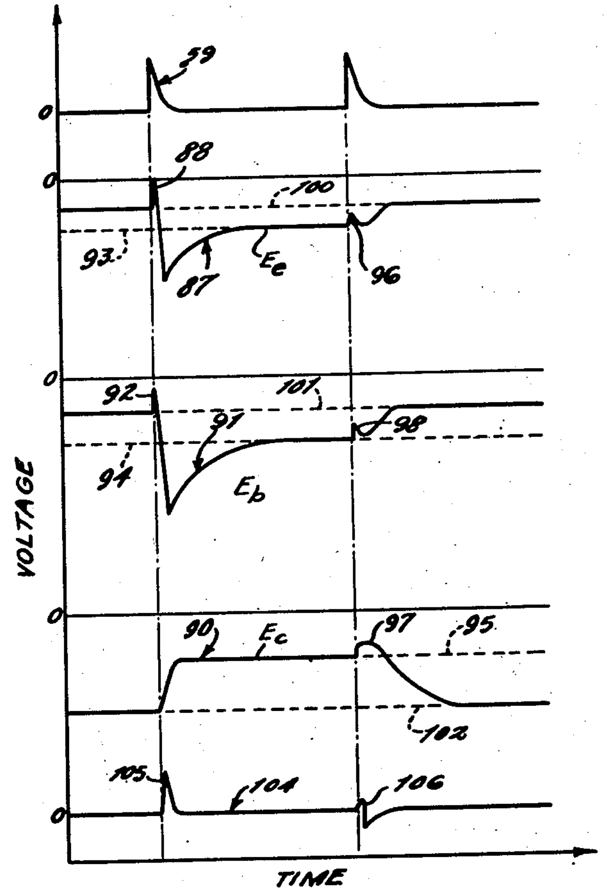
Figure 8 is a graph showing the voltages existing at various points of the circuit of Figure 7.

Due to the provision of stabilizing capacitor 58 the flip-flop circuit or counter of Figure 7 operates differently from the previously described circuits, as illustrated in Figure 8. Let it be assumed that the counter of Figure 7 is again in its low current conduction state. Now a trigger pulse 59 (see Figures 7 and 8) is impressed on input terminals 25. As clearly shown in Figures 7 and 8 pulses 59 need not have a steep trailing edge as have trigger pulses 24. Since capacitor 26 and resistor 22 are not arranged as a differentiating network, trigger pulse 59 is impressed substantially without shaping to emitter electrode 11. The emitter voltage $E_e$ is illustrated by curve 87 of Figure 8. Trigger pulse 59 accordingly will drive the emitter voltage in a positive direction so that the emitter voltage may approach ground potential as shown at 88. The emitter voltage then falls in a negative direction as clearly shown by curve 87 due to the increased emitter current when the counter is triggered into its high current conduction state.

The initial increase in the emitter voltage causes a corresponding increase of the collector voltage $E_c$ as illustrated by curve 90. This in turn will cause a larger collector current to flow due to the regenerative action of resistors 28 and 45 as previously described. The base voltage $E_b$ shown by curve 91 first increases in a positive direction as shown at 92 when the emitter voltage is initially driven more positive. The large collector current which thereafter flows through base resistor 45 will drive the base voltage in a negative direction as clearly shown.

Before the collector voltage 90 can become more positive, stabilizing capacitor 58 which has previously been charged to a comparatively high negative potential, must be discharged through collector electrode 12, base electrode 13 and base resistor 45. Eventually the counter assumes its high current conduction state or equilibrium. Thus, the emitter voltage $E_e$, the base voltage $E_b$ and the collector voltage $E_c$ assume their equilibrium values shown respectively by dotted lines 93, 94 and 95.

The next or succeeding positive trigger pulse 59 will now cause the counter to flop into its low current conduction state. Thus, the succeeding trigger pulse 59 impressed on emitter electrode 11 will cause the emitter voltage to rise rapidly and to fall slowly again in response to the trailing edge of the trigger pulse as shown at 96. The collector voltage 90 also increases in a positive direction due to the feedback connection provided by resistor 28 and capacitor 52. As shown by curve portion 97 the collector voltage is now above its high equilibrium state illustrated by dotted line 95. The base voltage 91 follows essentially the emitter voltage as shown by curve portion 98.

The further rise of the collector voltage above its equilibrium state 95 is illustrated by curve portion 97 and causes a further discharge of stabilizing capacitor 58. Accordingly, after the peak of trigger pulse 59 has passed, the collector voltage tends to fall again in a negative direction. During this time, stabilizing capacitor 58 is slowly charged in a negative direction from battery 15 through resistor 16. Due to the presence of stabilizing capacitor 58 the counter will pass rapidly through its high equilibrium state illustrated by dotted line 95 so that the collector voltage continues to fall. In other words, the counter cannot lock in its high equilibrium state. This, in turn, will reduce the current flowing between collector electrode 12 and base electrode 13 whereupon the base voltage rises in a positive direction. The emitter voltage will also rise in a positive direction. Eventually, emitter voltage $E_e$, base voltage $E_b$ and collector voltage $E_c$ assume their low current conduction equilibrium states illustrated respectively by dotted lines 100, 101 and 102. The cycle of operation now repeats upon the occurrence of the succeeding positive trigger pulses 59. The counter of Figure 7 may also be triggered by positive pulses applied to collector electrode 12 or by negative pulses applied to base electrode 13.

The output pulses derived from output terminals 30 and differentiated by network 31 and 55 are illustrated by curve 104. Curve 104 hence represents the differentiated collector voltage 90. It will be seen that the first trigger pulse 59 causes a sharp output pulse 105 of large amplitude while the second trigger pulse 59 will cause only a small output pulse 106. It is accordingly feasible to connect two counter stages of the type illustrated in Figure 7 in cascade without the necessity of using a clipper between the two counter stages.

Figure 9 illustrates a two-stage counter in accordance with the invention. The first counter stage includes semi-conducting body 10 and is similar to the flip-flop circuit of Figure 5. Thus, base electrode 13 is connected to ground through base resistor 45. Emitter electrode 11 is supplied with an adjustable negative bias voltage through tap 21 and resistor 22 in the manner described in connection with Figure 3. The trigger pulses 24 are applied to input terminals 25 and are impressed on emitter electrode 11 through coupling capacitor 26. Capacitor 26 and resistor 22 form a differentiating network. Emitter electrode 11 and collector electrode 12 are connected through resister 28 shunted by capacitor 52. Collector electrode 12 is supplied with a large negative bias voltage through battery 15 and load resistor 16. The square wave 36 (Figure 6) derived from collector electrode 12 of the first stage is differentiated by capacitor 65 and resistor 80 to obtain separate positive and negative pulses as shown by curve 60 (Figure 6). One terminal of resistor 80 is connected to tap 81 on voltage divider 82 connected across battery 18. Tap 81 is bypassed to ground by capacitor 83. Rectifier 84 which may be a crystal rectifier as shown or a thermionic diode passes only the positive pulses to capacitor 85 and resistor 86 connected between rectifier 84 and ground. Potentiometer 82 is provided so that rectifier 84 may be biased slightly in a non-conducting direction in order to completely eliminate or clip any positive pulse that may accompany the unwanted negative pulse of curve 60 in Figure 6, the clipping level indicated by dotted line 87 being adjustable by tap 81. Bypass capacitor 83 eliminates any effect that potentiometer 82 may have on the differentiating circuit. Thus, only the desired positive pulse is passed through capacitor 85 to the emitter electrode 66 of the second stage. Resistor 68 connected to tap 21 supplies the bias voltage to emitter electrode 66 and forms a partial differentiating network together with capacitor 85. Semi-conducting body 67 is provided with base electrode 71, connected to ground through base resistor 72, and with collector electrode 70. Emitter electrode 66 and collector electrode 70 are connected through resistor 73 shunted by capacitor 74. Resistor 75 connects collector electrode 70 to battery 15. The output signal is derived from output terminals 76 coupled to collector electrode 70 through capacitor 77. Resistor 78 is connected between capacitor 77 and output terminal 76 on the one hand and ground on the other hand. Accordingly, capacitor 77 and resistor 78 form a differentiating network.

The two counter stages of the circuit of Figure 9 are each identical with the single counter of Figure 5 except that resistors 56, 53 and 54 have been omitted. The two emitter electrodes of the two stages are connected to the same bias battery 18 while the two collector electrodes 12 and 70 are connected to the bias battery 15. Output pulses are derived from output terminals 76 which, after being clipped, have one quarter of the frequency of the trigger pulses supplied to input terminals 25. The count-down ratio accordingly is 4 to 1. The two stage counter of Figure 7 requires a power of approximately 0.3 watt which is from one tenth to one twentieth of the power of a conventional two-stage flip-flop circuit. The circuit of Figure 9 operates essentially in the manner of the circuit of Figure 5 so that further explanation is not deemed to be necessary.

There has thus been disclosed a triggered flip-flop circuit requiring but a single amplifier of the semi-conductor type. The flip-flop circuit is essentially a counter having a count down ratio of two and is responsive to trigger pulses of a frequency which may vary within wide limits because the counter does not require a time constant network. Two or more counter circuits may be connected in cascade through a rectifier or clipper to obtain a multi-stage counter circuit which may be arranged as a decade counter in accordance with conventional practice. The flip-flop circuit may be used for electronic counters or computers and requires of the order of one tenth the power of previously known circuits and develops considerably less heat than conventional counter circuits including thermionic tubes. Furthermore, the physical space required for a flip-flop circuit utilizing a three-electrode semi-conductor is considerably less than that needed for conventional circuits. Thus, the flip-flop circuit of the invention is particularly suitable for complicated electronic counters or computers.

What is claimed is:

1. A triggered circuit comprising a semi-conductor device including a semi-conducting body, a low-resistance base electrode, a small-area emitter electrode and a small-area collector electrode in contact with said body, means for applying potentials to said electrodes, means for impressing trigger pulses on one of said electrodes, and an impedance element effectively coupling said emitter and collector electrodes whereby one of said small-area electrodes is rendered responsive to changes of the current flowing through and changes of the voltage existing at one of the other of said electrodes.

2. A triggered circuit comprising a semi-conductor device including a semi-conducting body, a base electrode, an emitter electrode and a collector electrode contacting said body, means for applying potentials to said electrodes, means for impressing trigger pulses between two of said electrodes, and a resistive impedance element common to both said emitter and collector electrodes, thereby to render said emitter electrode responsive to changes of the current flowing through and changes of the voltage existing at one of the other of said electrodes.

3. A triggered circuit comprising a semi-conductor device including a semi-conducting body, a low-resistance base electrode, a small-area emitter electrode and a small-area collector electrode in contact with said body, means for applying potentials to said electrodes including at least one impedance element connected to one of said small-area electrodes, means for impressing trigger pulses between two of said electrodes, and a further impedance element effectively coupling said emitter and collector electrodes, thereby to render one of said small-area electrodes responsive to changes of the current flowing through and changes of the voltage existing at one of the other of said electrodes.

4. A triggered circuit comprising a semi-conductor device including a semi-conducting body, a low-resistance base electrode, a small-area emitter electrode and a small-area collector electrode in contact with said body, means for supplying potentials to said electrodes to render them normally operating including at least one impedance element connected to one of said small-area electrodes, means for impressing trigger pulses between two of said electrodes, and a further impedance element common to both said emitter and collector electrodes, thereby to render said emitter electrode responsive to changes of the current flowing through and changes of the voltage existing at one of the other of said electrodes.

5. A triggered counter comprising a semi-conducting body, a base electrode, an emitter electrode and a collector electrode contacting said body, means for applying operating potentials to said electrodes, means for impressing trigger pulses on one of said electrodes, and an impedance element effectively connected to said emitter and collector electrodes to provide a circuit admittance common to both said emitter and collector electrodes.

6. A triggered counter comprising a semi-conductor device including a semi-conducting body, a base electrode, an emitter electrode and a collector electrode in contact with said body, means for applying operating potentials to said electrodes, means for impressing trigger pulses on one of said electrodes, and an impedance element effectively coupled to and common to both said emitter and collector electrodes to provide an impedance common to both said emitter and collector electrodes.

7. A triggered counter comprising a semi-conductor device including a semi-conducting body, a base electrode, an emitter electrode and a collector electrode contacting said body, means for applying operating potentials to said electrodes, means for impressing trigger pulses on one of said electrodes, a first impedance element connected between said emitter and collector electrodes to provide a circuit admittance common to both said emitter and collector electrodes, and a second impedance element effectively coupled to and common to both said emitter and collector electrodes to provide an impedance common to both said emitter and collector electrodes.

8. A triggered flip-flop circuit comprising a semi-conducting body, a base electrode, an emitter electrode and a collector electrode in contact with said body, a source of voltage connected to said electrodes for biasing said base and collector electrodes in a relatively non-conducting polarity and for normally biasing said base and emitter electrodes in a relatively conducting polarity, a first impedance element connected between said source and said collector electrode, a second impedance element connected between said collector and emitter electrodes to control the voltage of said emitter electrode in accordance with the current flowing through said first impedance element, and means for impressing trigger pulses on one of said electrodes, thereby to trigger said circuit from one stable condition of current conduction to its other stable condition of current conduction.

9. A triggered flip-flop circuit comprising a semi-conducting body, a base electrode, an emitter electrode and a collector electrode contacting said body, a first source of voltage connected between said base and collector electrodes for biasing them in a relatively non-conducting polarity, a first impedance element connected between said first source and said collector electrode, a second source of voltage connected between said base and emitter electrodes for normally biasing them in a relatively conducting polarity, a second impedance element connected between said collector and emitter electrodes to control the voltage of said emitter electrode in accordance with the current flowing through said first impedance element, a third impedance element connected between said second source and said emitter electrode, means for impressing trigger pulses of opposite polarities between said emitter and base electrodes, thereby to trigger said circuit from one stable condition of current conduction to its other stable condition of current conduction, and an output circuit coupled to said first impedance element.

10. A triggered flip-flop circuit comprising a semi-conducting body, a base electrode, an emitter electrode and a collector electrode in contact with said body, a source of voltage connected to said electrodes for biasing said base and collector electrodes in a relatively non-conducting polarity and for normally biasing said base and emitter electrodes in a relatively conducting polarity, a first resistor connected between said source and said collector electrode and a second resistor connected between said collector and emitter electrodes to control the voltage of said emitter electrode in accordance with the current flowing through said first resistor, and means including a differentiating network for impressing pulses between said emitter and base electrodes, thereby to trigger said circuit from one stable condition of current conduction to its other stable condition of current conduction.

11. A triggered flip-flop circuit comprising a semi-conducting body, a base electrode, an emitter electrode and a collector electrode contacting said body, a first source of voltage connected between said base and collector electrodes for biasing them in a relatively non-conducting polarity, a first resistor connected between said first source and said collector electrode, a second source of voltage connected between said base and emitter electrodes for normally biasing them in a relatively conducting polarity, a second resistor connected between said collector and emitter electrodes to control the voltage of said emitter electrode in accordance with the current flowing through said first resistor, a third resistor connected between said second source and said emitter electrode, means for impressing pulses of opposite polarities between said emitter and base electrodes, thereby to trigger said circuit from one stable condition of current conduction to its other stable condition of current conduction, and an output circuit connected across said first resistor.

12. A triggered flip-flop circuit comprising a semi-conducting body, a base electrode, an emitter electrode and a collector electrode in contact with said body, means including a source of voltage for biasing said base and collector electrodes in a relatively non-conducting polarity and for normally biasing said base and emitter electrodes in a relatively conducting polarity, an impedance element connected to said base electrode for controlling the effective voltage between said emitter and base electrodes in accordance with the current flowing therethrough, and means for impressing pulses on one of said electrodes, thereby to trigger said circuit from one stable condition of current conduction to its other stable condition of current conduction.

13. A triggered flip-flop circuit comprising a semi-conducting body, a base electrode, an emitter electrode and a collector electrode in contact with said body, means including a source of voltage connected to said electrodes for biasing said base and collector electrodes in a relatively non-conducting polarity and for normally biasing said base and emitter electrodes in a relatively conducting polarity, an impedance element connected between said source and said base electrode for controlling the effective voltage between said emitter and base electrodes in accordance with the current flowing therethrough, means for impressing pulses effectively between said emitter and collector electrodes, thereby to trigger said circuit from one stable condition of current conduction to its other stable condition of current conduction, and an output circuit including said impedance element.

14. A triggered flip-flop circuit comprising a semi-conducting body, a base electrode, an emitter electrode and a collector electrode contacting said body, a first source of voltage connected between said base and collector electrodes for biasing them in a relatively non-conducting polarity, a resistor connected between said first source and said base electrode, a second source of voltage connected between said first source and said emitter electrode for normally biasing said base and emitter electrodes in a relatively conducting polarity, said resistor controlling the effective voltage between said emitter and base electrodes in accordance with the current flowing through said impedance element, and means including an impedance element for impressing pulses effectively between said emitter and collector electrodes, thereby to trigger said circuit from one stable condition of current conduction to its other stable condition of current conduction.

15. A triggered flip-flop circuit comprising a semi-conducting body, a base electrode, an emitter electrode and a collector electrode in contact with said body, a first source of voltage connected between said base and collector electrodes for biasing them in a relatively non-conducting polarity, a first impedance element connected between said first source and said base electrode, a second source of voltage connected between said first source and said emitter electrode for normally biasing said base and emitter electrodes in a relatively conducting polarity, a second impedance element connected between said second source and said emitter electrode, said first impedance element controlling the effective voltage between said emitter and base electrodes in accordance with the current flowing through said first impedance element, means including a differentiating network for impressing pulses of opposite polarities effectively between said emitter and collector electrodes, thereby to trigger said circuit from one stable condition of current conduction to its other stable condition of current conduction, and an output circuit connection across said first impedance element.

16. A triggered flip-flop circuit comprising a semi-conducting body, a base electrode, an emitter electrode and a collector electrode contacting said body, a first impedance element connected between said base electrode and a point of relatively fixed potential, a second impedance element connected between said emitter and collector electrodes, a source of potential for maintaining said collector and base electrodes at a relatively non-conducting polarity and for maintaining said emitter and base electrodes at a predetermined polarity, and means for impressing trigger pulses on one of said electrodes.

17. A triggered flip-flop circuit comprising a semi-conducting body, a base electrode, an emitter electrode and a collector electrode contacting said body, a first impedance element connected between said base electrode and a point of relatively fixed potential, a second impedance element connected between said emitter and collector electrodes, a source of potential connected to said electrodes for maintaining said collector and base electrodes at a relatively non-conducting polarity and for maintaining said emitter and base electrodes at a relatively conducting polarity, a third impedance element connected to said collector electrode, a differentiating network connected between a point of fixed potential and said emitter electrode for impressing trigger pulses thereon, and an output connection across said third impedance element.

18. A triggered flip-flop circuit comprising a semi-conducting body, a base electrode, an emitter electrode and a collector electrode in contact with said body, a first resistor connected between said base electrode and a point of relatively fixed potential, a second resistor connected between said emitter and collector electrodes, a capacitor connected in shunt with said second resistor, a source of potential, a third resistor connected serially with said source between said collector electrode and said point of fixed potential for maintaining said collector and base electrodes at a relatively non-conducting polarity, a connection between said source and said emitter electrode for maintaining said emitter and base electrodes at a relatively conducting polarity, a differentiating network connected between a point of fixed potential and said emitter electrode for impressing trigger pulses thereon, and an output connection across said third resistor.

19. A triggered flip-flop circuit comprising a semi-conducting body, a base electrode, an emitter electrode and a collector electrode contacting said body, a first impedance element connected between said base electrode and a point of relatively fixed potential, a resistor connected between said emitter and collector electrodes, a capacitor connected in shunt with said resistor, a source of potential, a second impedance element connected serially with said source between said collector electrode and said point of fixed potential for maintaining said collector and base electrodes at a relatively non-conducting polarity, a connection between said source and said emitter electrode for maintaining said emitter and base electrodes at a relatively conducting polarity, a differentiating network connected between a point of fixed potential and said emitter electrode for impressing trigger pulses thereon, and an output circuit including a further differentiating network connected across said second impedance element.

20. A triggered flip-flop circuit comprising a semi-conducting body, a base electrode, an emitter electrode and a collector electrode in contact with said body, a first resistor connected between said base electrode and a point of relatively fixed potential, a resistive network connected between said emitter and collector electrodes, a capacitor connected in shunt with an intermediate portion of said resistive network, a first source of potential, a second resistor connected serially with said first source between a junction point of said resistive network and capacitor and said point of fixed potential for maintaining said collector and base electrodes at a relatively non-conducting polarity, a third resistor, a second source of potential connected serially with said third resistor between the other junction point of said resistive network and capacitor and said point of fixed potential for maintaining said emitter and base electrodes at a relatively conducting polarity, a differentiating network including said third resistor and connected effectively between said second source and said emitter electrode for impressing trigger pulses thereon, and an output circuit including a further differentiating network and connected effectively across said second resistor.

21. A pulse counter comprising a semi-conducting device including a semi-conducting body, a base electrode, an emitter electrode and a collector electrode in contact with said body, a first impedance element connected between said emitter and collector electrodes, a source of potential, a second impedance element connected serially with said source between said collector electrode and said point of fixed potential for maintaining said collector and base electrodes at a relatively non-conducting polarity, means for maintaining said emitter and base electrode at a relatively conducting polarity, a capacitor connected between said collector electrode and said point of relatively fixed potential, and means for impressing trigger pulses of one polarity on one of said electrodes.

22. A pulse counter comprising a semi-conducting device including a semi-conducting body, a base electrode, an emitter electrode and a collector electrode in contact with said body, a first resistor connected between said base electrode and a point of relatively fixed potential, a second resistor connected between said emitter and collector electrodes, a source of potential, a third resistor connected serially with said source between said collector electrode and said point of fixed potential for maintaining said collector and base electrodes at a relatively non-conducting polarity, means for maintaining said emitter and base electrode at a relatively conducting polarity, a capacitor connected between said collector electrode and said point of relatively fixed potential, and means for impressing trigger pulses of one polarity on said emitter electrode.

23. A pulse counter comprising a semi-conducting device including a semi-conducting body, a base electrode, an emitter electrode and a collector electrode in contact with said body, a first resistor connected between said base electrode and a point of relatively fixed potential, a second resistor connected between said emitter and collector electrodes, a first capacitor connected in shunt with said second resistor, a source of potential, a third resistor connected serially with said source between said collector electrode and said point of fixed potential for maintaining said collector and base electrodes at a relatively non-conducting polarity, means for maintaining said emitter and base electrode at a relatively conducting polarity, a second capacitor connected between said collector electrode and said point of relatively fixed potential, means for impressing trigger pulses of one polarity on one of said electrodes, and an output connection across said third resistor.

24. A two-stage counter comprising a first stage including a first semi-conducting body, a first base electrode, a first emitter electrode and a first collector electrode; a second stage including a second semi-conducting body, a second base electrode, a second emitter electrode and a second collector electrode; means including a source of potential for biasing said collector electrodes in a relatively non-conducting polarity with respect to their associated base electrodes and for biasing said emitter electrodes in a relatively conducting polarity with respect to their associated base electrodes, an impedance element connected between each of said collector electrodes and said source, a resistor connected between each base electrode and one terminal of said source, a further resistor connected between each emitter electrode and its associated collector electrode, a first differentiating network connected between a point of relatively fixed potential and said first emitter electrode for impressing trigger pulses on said first emitter electrode, a second differentiating network connected between said first collector electrode and said second emitter electrode for coupling said two stages, a clipper connected between said second differentiating network and said second emitter electrode, and an output circuit connected effectively across the impedance element associated with said second collector electrode for deriving output pulses at one quarter the rate of occurrence of said trigger pulses.

25. A two-stage counter comprising a first stage including a first semi-conducting body, a first base electrode, a first emitter electrode and a first collector electrode; a second stage including a second semi-conducting body, a second base electrode, a second emitter electrode and a second collector electrode; means including at least one source of potential for biasing said collector electrodes in a relatively non-conducting polarity with respect to their associated base electrodes and for biasing said emitter electrodes in a relatively conducting polarity with respect to their associated base electrodes, an impedance element connected between each of said collector electrodes and said source, a resistor connected between each base electrode and one terminal of said source, a network including a further resistor shunted by a capacitor and connected between each emitter electrode and its associated collector electrode, a first differentiating network connected between a point of relatively fixed potential and said first emitter electrode for impressing trigger pulses on said first emitter electrode, a second differentiating network connected between said first collector electrode and said second emitter electrode for coupling said two stages, a rectifier connected between said second differentiating network and said second emitter electrode, and an output circuit connected effectively across one of said impedance elements associated with said second collector electrode for deriving output pulses at one quarter the rate of occurrence of said trigger pulses.

26. A two-stage counter comprising a first stage including a first semi-conducting body, a first base electrode, a first emitter electrode and a first collector electrode; a second stage including a second semi-conducting body, a second base electrode, a second emitter electrode and a second collector electrode; means including at least one source of potential for biasing said collector electrodes in a relatively non-conducting polarity with respect to their associated base electrodes and for biasing said emitter electrodes in a relatively conducting polarity with respect to their associated base electrodes, an impedance element connected between each of said collector electrodes and said source, a resistor connected between each base electrode and one terminal of said source, a network including a further resistor shunted by a capacitor and connected between each emitter electrode and its associated collector electrode, a first differentiating network connected between a point of relatively fixed potential and said first emitter electrode for impressing trigger pulses on said first emitter electrode, a second differentiating network connected between said first collector electrode and said second emitter electrode for coupling said two stages, a clipper connected between said second differentiating network and said second emitter electrode, means for biasing said clipper in a predetermined direction to remove pulses of predetermined polarity derived from said second differentiating network, and a third differentiating network connected between a point of relatively fixed potential and said second collector electrode for deriving differentiated output pulses at one quarter the rate of occurrence of said trigger pulses.

EVERETT EBERHARD.

REFERENCES CITED

The following references are of record in the file of this patent:

"A Transistor Trigger Circuit," by Reich and Ungvary, from The Review of Scientific Instruments, August, 1949, pages 586–588.

Disclaimer 2,533,001.—*Everett Eberhard*, Haddonfield, N.J. FLIP-FLOP COUNTER CIRCUIT. Patent dated Dec. 5, 1950. Disclaimer filed July 27, 1960, by the assignee, *Radio Corporation of America.*

Hereby enters this disclaimer to claims 13 and 14 of said patent.

[*Official Gazette September 6, 1960.*]